(12) United States Patent
Teter et al.

(10) Patent No.: US 6,281,947 B1
(45) Date of Patent: Aug. 28, 2001

(54) MASK-FREE, SINGLE GUN, COLOR TELEVISION SYSTEMS

(75) Inventors: Michael P. Teter, Painted Post; James Michael Harris, Elmira, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/045,844

(22) Filed: Mar. 20, 1998

Related U.S. Application Data

(60) Provisional application No. 60/041,035, filed on Mar. 21, 1997.

(51) Int. Cl.$^7$ ..................................................... H04N 9/24
(52) U.S. Cl. ........................... 348/742; 348/810; 348/812; 313/471
(58) Field of Search ...................................... 348/742, 805, 348/806, 807, 811, 812, 813, 808; 358/66, 67, 68, 69; 313/471, 467, 470; 315/368.11, 368.12, 364, 369–371; H04N 9/22, 9/24, 9/28

(56) References Cited

U.S. PATENT DOCUMENTS

| | | |
|---|---|---|
| 3,030,439 | 4/1962 | Justice . |
| 3,041,391 | 6/1962 | Chatten . |
| 3,116,364 | 12/1963 | Moore . |
| 3,383,547 | 5/1968 | Alpers . |
| 3,406,251 | 10/1968 | Jones . |
| 3,662,102 | 5/1972 | Herndon . |
| 3,732,359 | 5/1973 | Chen . |
| 3,875,450 | 4/1975 | Thompson . |
| 4,159,484 | 6/1979 | Strathman . |
| 4,240,073 | 12/1980 | Seats et al. . |
| 4,268,856 | 5/1981 | Akazawa . |
| 4,333,105 | 6/1982 | Kaku et al. . |
| 4,369,460 | 1/1983 | Weiss . |
| 4,408,223 | 10/1983 | Midland . |
| 4,514,756 | 4/1985 | Blank et al. . |
| 4,527,192 | 7/1985 | Midland et al. . |
| 4,635,106 | 1/1987 | Shinkai . |
| 4,635,107 | 1/1987 | Turner . |
| 4,658,288 | 4/1987 | Midland et al. . |
| 4,680,599 | 7/1987 | Wertz et al. . |
| 4,752,716 | 6/1988 | Takeuchi . |
| 4,977,447 | 12/1990 | Takenaka et al. . |
| 4,988,927 | 1/1991 | Spruck . |
| 5,198,730 | 3/1993 | Vancil . |

OTHER PUBLICATIONS

Macaulay, M., "An Experimental Single–Gun Simultaneous Color Kinescope," SID Symposium, Jun. 6–8 1972, 73.

Murphy, A.S., *IBM Technical Disclosure Bulletin*, 1979, 21:5025.

Ohkoshi et al., "A New 30–Inch Beam–Index Color Cathode Ray Tube" *IEEE Transactions on Consumer Electronics*, CE–27, No. 3, 433–443, Aug. 1981.

Turner, J., "A New Beam Indexing Color Display Tube Using Direct Pick–Up of the Electron Beam— The Turner Tube," IEEE Biennial Display Conference, 83–87, 1976.

Weber, E.V., *IBM Technical Disclosure Bulletin*, 1962, 4:2.

*Primary Examiner*—David E. Harvey
(74) *Attorney, Agent, or Firm*—Maurice M. Klee

(57) ABSTRACT

A system for displaying a color broadcast television signal is provided. The system employs a cathode ray tube (CRT) which has only one electron gun and does not have a mask. The faceplate of the CRT has red, green, and blue phosphor stripes which form triads. A beam positioning gap, which may be patterned, is associated with each triad. By scanning the tube's electron beam along the beam positioning gap, vertical position information is obtained which is then used to accurately position the beam on the phosphor stripes as the stripes are scanned. Flyback of the electron beam can be avoided by scanning the phosphor stripes and the beam positioning gap in a serpentine pattern.

24 Claims, 5 Drawing Sheets

MASK-FREE, SINGLE GUN, COLOR TELEVISION SYSTEMS

CROSS REFERENCE TO RELATED PROVISIONAL APPLICATION

This application claims the benefit under 35 USC §119(e) of U.S. Provisional Application No. 60/041,035, filed Mar. 21, 1997, which is hereby incorporated by reference.

FIELD OF THE INVENTION

This invention relates to color television systems and, in particular, to color television systems which use a single electron gun and do not use a shadow mask.

1. Background of the Invention

A conventional color television tube has three electron guns (i.e., one gun for the red image, a second gun for the green image, and a third gun for the blue image) and a shadow mask or aperture grill which serves to block the three electron beams produced by the guns from hitting the wrong phosphors on the face of the tube. While the shadow mask accomplishes this purpose, it causes many difficulties.

For example, approximately 80% of the total electron beam current produced by a gun hits the shadow mask, and is dissipated therein as heat. This heating causes the mask to expand and to eventually lose its registration with the tube's phosphors. The process is called doming, and results in an upper limit on the tube's brightness since as higher beam currents are used to achieve greater brightness, more heating and thus more doming occurs.

The mask also limits the resolution of the display, which depends on the number and size of the holes in the mask. There are plainly only so many holes that one can put in a mask and still keep it stiff. Also, as the hole size decreases, less of the electron beam reaches the phosphor, thus lowering the brightness.

Without a shadow mask these doming and resolution problems are eliminated. In addition, other drawbacks of conventional CRTs, e.g., x-ray emission from the mask as a result of electron bombardment, excessive weight, and relatively high cost, can be eliminated or reduced.

Efforts have been made in the past to remove the shadow mask in accordance with an approach known as "beam indexing." This approach has had some technical success, but has failed economically except for highly specialized applications, such as radar screens.

The primary difficulty with beam indexing is that it requires high speed switching of the beam as it passes over each vertical phosphor line. In particular, the beam has to be turned on and off in a window of a few nanoseconds with an intensity precision of one per cent or better as it passes over the center of the phosphor line. A beam position sensing means is thus needed which is capable of determining the position of the beam to high accuracy to allow this critical timing to be right.

On-and-off switching and position sensing of this type turns out to be difficult to implement and very expensive. The only company known to have actually produced color television tubes in accordance with this approach is Sony Corporation. See "A New 30-Inch Beam-Index Color Cathode Ray Tube" by A. Ohkoshi et al., *IEEE Transactions on Consumer Electronics,* CE-27, No 3, 433–443, Aug. 1981. This tube was never introduced into mass production due to its cost.

2. Description of the Prior Art

Beam-index type television systems are described in various patents and publications including: Justice, U.S. Pat. No. 3,030,439; Chatten, U.S. Pat. No. 3,041,391; Moore, U.S. Pat. No. 3,116,364; Alpers, U.S. Pat. No. 3,383,547; Jones, U.S. Pat. No. 3,406,251; Chen, U.S. Pat. No. 3,732,359; Thompson, U.S. Pat. No. 3,875,450; Strathman, U.S. Pat. No. 4,159,484; Seats et al., U.S. Pat. No. 4,240,073; Akazawa, U.S. Pat. No. 4,268,856; Kaku et al., U.S. Pat. No. 4,333,105; Weiss, U.S. Pat. No. 4,369,460; Midland, U.S. Pat. No. 4,408,223; Blank et al., U.S. Pat. No. 4,514,756; Midland et al., U.S. Pat. No. 4,527,192; Shinkai, U.S. Pat. No. 4,635,106; Turner, U.S. Pat. No. 4,635,107; Midland et al., U.S. Pat. No. 4,658,288; Takeuchi, U.S. Pat. No. 4,752,716; and Turner, J., "A New Beam Indexing Color Display Tube Using Direct Pick-Up of the Electron Beam—The Turner Tube," IEEE Biennial Display Conference, 83–87, 1976.

A general discussion of cathode ray tubes can be found in *The Cathode-Ray Tube* by Peter A. Keller, Palisades Press, New York, N.Y., 1991.

The relevant portions of the above references and of the references referred to below are incorporated herein by reference.

SUMMARY OF THE INVENTION

To address the above problems in the prior art, the invention provides a system for displaying a color broadcast television signal which comprises a series of frames (e.g., 30 frames per second), each frame being composed of a series of lines (e.g., 525 interlaced lines per frame of which 483 lines form the visible image), said system comprising:

(A) a cathode ray tube which:
   (i) does not have a mask;
   (ii) has only one electron gun, the gun producing an electron beam;
   (iii) has a faceplate which defines an x-axis (typically, the horizontal axis) and a y-axis (typically, the vertical axis);
   (iv) has red phosphor stripes, green phosphor stripes, and blue phosphor stripes which are parallel to the x-axis and are organized into triads, the number of triads being at least equal to number of broadcast lines in a frame;
   (v) has a plurality of beam positioning means which are parallel to the x-axis, one beam positioning means being associated with each triad, e.g., the beam positioning means is directly above (or below) the triad;

(B) two subsystems for performing line buffering, wherein:
   (i) each subsystem is able to convert the red, green, and blue information of a line of the broadcast signal from the broadcast signal's parallel form into a serial form so that the red, green, and blue phosphor stripes of a triad can be scanned serially, the two subsystems working alternately on the lines of the broadcast signal, i.e., the first subsystem handles the first broadcast line, the second subsystem handles the second line, the first subsystem handles the third line, and so forth; and
   (ii) each subsystem has an input state during which it receives and processes a line of the broadcast signal and an output state during which it outputs serial information, one subsystem being in the input state while the other subsystem is in the output state; and (C) a control system which for each broadcast line:
   (i) toggles the subsystems between the input and output states;

(ii) selects an appropriate beam positioning means for the particular broadcast line and then scans the electron beam along said selected means (i.e., scans the electron beam in a direction parallel to the x-axis) to obtain information regarding the beam's position in the direction of the y-axis, i.e., its "y" position, as a function of its scan position along said selected means;

(iii) stores the information obtained in (C)(ii) in a memory; and (iv) serially scans the electron beam along the red, green, and blue phosphors stripes of the triad with which the selected beam positioning means is associated, using:

(a) the serial information of the line buffer which is in the output state to control the intensity of the beam as a function of its scan position along a phosphor stripe, i.e., the red serial information is used to control the intensity when the red stripe is scanned, the green information is used when the green stripe is scanned, and the blue information is used when the blue stripe is scanned; and (b) the stored information of (C)(iii) to control the position of the beam in the direction of the y-axis as the beam is scanned along each stripe so as to align the beam with the stripe in the y-direction throughout the scan of the stripe.

A color television system of this type avoids the timing problem of the prior art beam index approach by scanning in the same direction as the phosphor lines, rather than across them. The control problem is then changed from a high speed synchronization problem to one of low speed position control along the phosphor stripes.

In accordance with the invention, it has been found that such low speed position control can be achieved without encountering the technical and economic difficulties which plagued the prior art beam index approach. As a result, the invention provides a practical way for satisfying the long standing need in the art for a mask-free, single gun, color television system which can be economically produced.

DETAILED DESCRIPTION OF THE INVENTION

Figure 1:
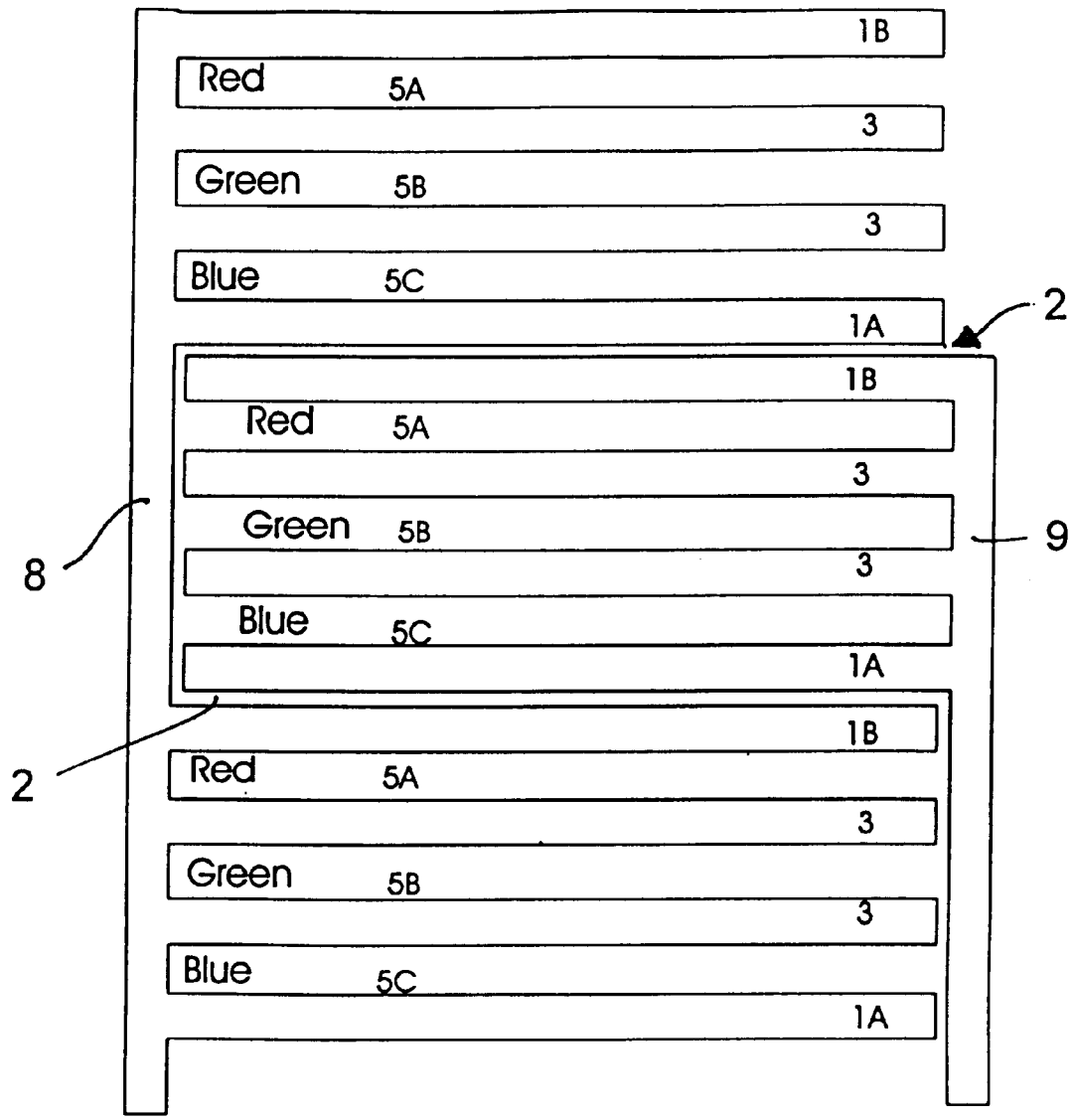
FIG. 1 is a schematic diagram of a system of phosphor stripes and horizontal line electrodes which can be used in the practice of the invention.

As discussed above, the television systems of the invention produce color images by serially scanning a single electron beam along (1) beam positioning means and (2) the red, green, and blue stripes of phosphor triads.

Positioning of the electron beam at desired horizontal and vertical (x, y) locations on the faceplate of the cathode ray tube can be performed using an electromagnetic deflection system (i.e., a deflection yoke) or through the use of a hybrid system which employs both electromagnetic and electrostatic deflection. See Takenaka et al., U.S. Pat. No. 4,977,447; Weber, E.V., *IBM Technical Disclosure Bulletin*, 1962, 4:27; and Macaulay, M., "An Experimental Single-Gun Simultaneous Color Kinescope," SID Symposium, Jun. 6–8 1972, 73. In the case of a hybrid system, electromagnetic deflection is used for horizontal scanning and coarse vertical positioning, and electrostatic deflection is used for fine vertical positioning of the beam on the beam positioning means and the phosphor stripes.

The electron beam should have the smallest possible spot size which is consistent with the beam current needed for the image brightness which is desired. A small beam size ensures color purity and the lack of splashover onto a phosphor stripe as the beam runs along the beam positioning means. A spot size of a few thousandths of an inch is suitable for a tube having a vertical dimension of about 1.5 feet which is divided into approximately 2,000 horizontal regions (i.e., one beam positioning means plus three color phosphor stripes times 500 lines/frame).

Because the system scans first the red then the green and then the blue phosphor lines, and because television pictures are not broadcast in this manner, two subsystems (two line buffers) are used to take the broadcast picture in which the RGB signals come in parallel, and convert them to a serial output. While the first buffer is serially reading out the RGB signals from the first line, the second buffer is storing the parallel RGB set for the next line, and then they flip their functionality. U.S. Pat. No. 5,198,730 discusses parallel to serial conversion of a broadcast signal in connection with a cathode ray tube which employs a moving shadow mask.

The sequence in which the picture is written is as follows. First the vertical position correction necessary to keep the beam on a horizontal line parallel to the phosphors is determined using the beam positioning means. Then using this position information, the red, green and blue phosphors are scanned sequentially using the intensity information contained in the line buffer.

The sequence of phosphors can, of course, be different from red/green/blue, although red/green/blue is the conventional arrangement. Also, the beam positioning scan can be used for more than one triad. In practice, it has been found that a single positioning scan can be used for at least ten triads for the ambient electromagnetic fields capable of interacting with the electron beam which one can expect to encounter in most residential and commercial buildings. However, beam positioning for each triad is preferred since it improves the robustness of the system, e.g., it provides redundancy of the positioning signal to reject noise and allows some of the positioning lines to be defective.

In a conventional television, the three electron beams scan left-to-right to produce the light intensity pattern of a broadcast line and then flyback to the left to be ready for the next broadcast line. Such a flyback approach can be used with the present invention, in which case horizontal scanning will occur at four times the rate of a conventional television.

To avoid flyback, the scanning of the phosphor stripes is preferably performed in a serpentine fashion, i.e., in a back-and-forth manner, with, for example, the beam positioning means being scanned left-to-right, the red stripe being scanned right-to-left, the green stripe being scanned left-to-right, and the blue stripe being scanned right-to-left. Note that for this example of serpentine scanning, the red and blue color information is read out in a direction opposite to the direction in which the information is read in from the broadcast signal.

With the serpentine approach, horizontal scanning still needs to be faster than with a conventional television, but now only slightly more than three times faster because the time needed for flyback has been eliminated. In addition to saving this time, the elimination of flyback reduces the demands on the electronic circuitry since flyback requires the application of rather large voltages to the deflection yoke in order to rapidly switch the electron beam from one side of the tube to other.

Due to hysteresis of the ferrites in the yoke, as well as non-linearities in the scan, it can be difficult to ensure that the pixels arising from a scan in one direction will lie directly above (below) those scanned in the opposite direction. These difficulties can be addressed by using a large square wave as the horizontal input voltage, i.e., a base input which in the absence of hysteresis or resistance in the yoke would produce a perfect linear scan, and adding a small correction signal to the base input to correct for the non-linearities. The correction signal can be stored digitally in part of the system's memory and converted to an analog signal which is added to the square wave using a D/A converter. Discussions of bi-directional scanning techniques can be found in Herndon, U.S. Pat. Nos. 3,662,102; Wertz et al., 4,680,599; Spruck, 4,988,927; and Murphy, A. S., *IBM Technical Disclosure Bulletin*, 1979, 21:5025.

An important aspect of the invention is that position sensing is done independently of the broadcast signal. The importance of such a separation was not recognized in much of the prior art. Without this separation, problems arise when the image is mostly dark with a few bright areas. Under these conditions, the use of a strong modulation on top of the broadcast signal to determine beam position will result in a loss of contrast in the dark areas since there will now be some beam current in these areas. On the other hand, the use of a weak modulation to avoid loss of contrast will make the signal hard to detect.

In accordance with the invention, there are no image producing phosphors in the immediate area of the beam positioning means so that the electron beam can be used solely for position sensing without concern for image effects.

A further aspect of the invention is the realization that only vertical position information is critical in obtaining a high quality color image. Horizontal errors in position merely lead to a slight shift of the entire picture.

The beam positioning means of the invention can take various forms. For example, an aluminized layer can be patterned into interdigitated sets of horizontal line electrodes, with one set having a bus on the right side of the tube and the other set having a bus on the left side of the tube, and with gaps between the line electrodes being located midway between phosphor triads.

When the electron beam is scanned along such a gap, a difference signal can be measured between the right side and left side busses if the beam is off center from the gap. While scanning along the gap, the correction to the beam position can be determined and stored. Then with an additional vertical displacement, the beam can be scanned down a phosphor line using the previously stored position correction.

To facilitate detection of the correction signal, the electron beam is preferably modulated in intensity during its scan along the gap, e.g., at a frequency of 5–50 MHz. Alternatively, the gap can be patterned, e.g., can be given a sawtooth pattern, so that a constant intensity beam produces an AC signal at each bus. If the beam is at the center of the sawtooth, the signal at the two busses will be square waves of equal duration. However, if it is off center, the signal at one of the busses will have a longer duration and the signal at the other will have a shorter duration, thus allowing the vertical location of the beam to be determined.

As a further variation, vertical fingers of different vertical lengths can be used to form the gap so that AC signals of at least two different frequencies are produced as a constant intensity beam is scanned across the fingers. An off center beam will differentially change the amplitudes of the signals at the two or more frequencies, thus allowing the vertical position of the beam to be determined. For an embodiment of this type, if desired, a single bus can be used to detect the positioning signal.

It should be noted that when the gap is patterned, the horizontal position of the beam can be determined by counting the pulses generated as the beam sweeps across the pattern.

FIG. 1 shows an arrangement of phosphor stripes and horizontal line electrodes which can be used in the practice of the invention. In this figure, red phosphor stripes are identified by the reference number 5A, green by 5B, and blue by 5C. The horizontal line electrodes internal to a triad are identified by the number 3, while those which border a triad by the numbers 1A and 1B.

Figure 2:
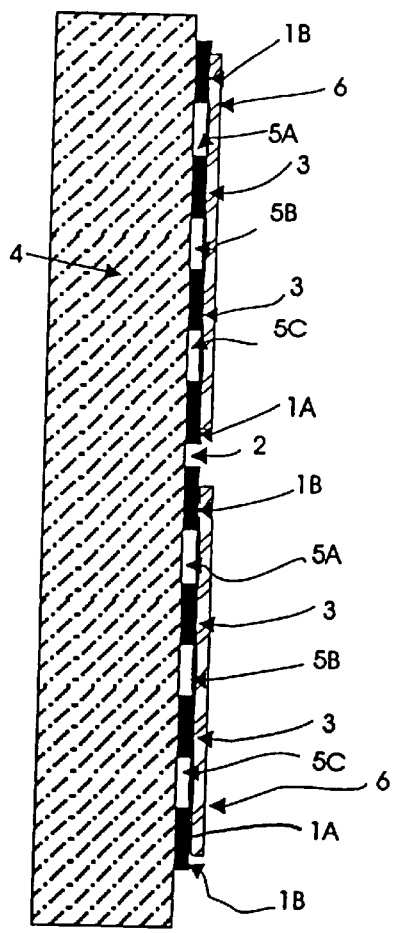
FIG. 2 is a cross-sectional view of the system of FIG. 1.
Figure 3:
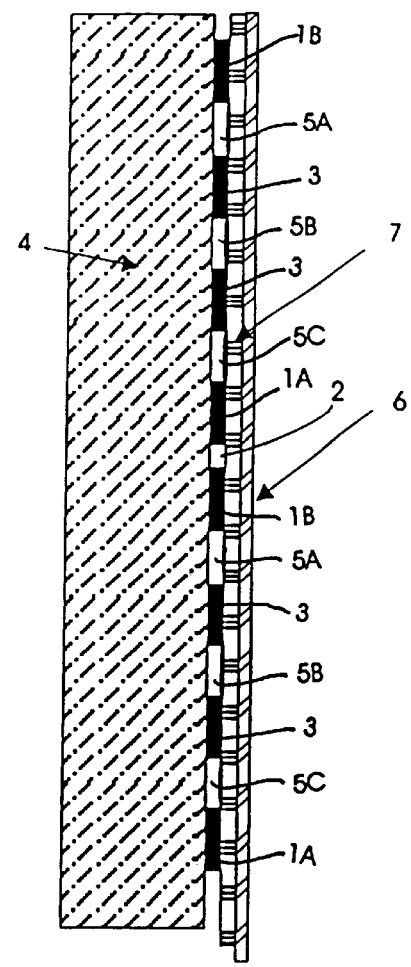
FIG. 3 is a cross-sectional view of an alternate construction of the system of FIG. 1.

FIG. 2 shows a cross-section of the FIG. 1 construction, where the glass face plate of the television tube is identified by the number 4. In addition to the components of FIG. 1, this cross-section shows the use of an aluminum layer 6 on the gun side of each triad. This layer is in electrical contact with the line electrodes of the triad and provides a drain path for the electrons emitted by the gun. Layer 6 also serves as a mirror to direct light emitted by the phosphors towards the viewer. FIG. 3 shows an alternate construction employing a continuous aluminum layer 6 and an insulating layer 7 between layer 6 and line electrodes 3, 1A, and 1B. Layer 6 for this embodiment is electrically connected to the tube's high voltage return (not shown).

Horizontal line electrodes 3 serve as guard stripes for the phosphor lines to help maintain color purity. Electrodes 1A and 1B also function as guard stripes, and most importantly, form gap 2 which provides the critical beam positioning information of the invention.

FIG. 1 illustrates a basic form for gap 2, namely, a straight gap with the line electrode above the gap being attached to a bus on one side of the tube and that below the gap to a bus on the other side of the tube. The vertical position of the electron beam is then determined by comparing the currents in the two buses as a function of the horizontal position of the electron beam.

For the gap between the upper most and middle triads of FIG. 1, the current in bus 8 will be greater than that in bus 9 when the beam is upwardly off center from the midline of the gap and vice versa when the beam is downwardly off center. For the gap between the middle triad and the bottom triad, the currents are reversed, i.e., the current in bus 9 is greater than that in bus 8 when the beam is high and vice versa when the beam is low. This reversal in the meaning of a larger current on a particular bus can be avoided, if desired, by using an electrode pattern in which the upper positioning electrode of each triad is always connected to, for example, the left bus and the lower positioning electrode of each triad is always connected to, for example, the right bus. As noted above, to facilitate detection of the positioning signal, it is preferred to modulate the intensity of the beam as it is swept along an unpatterned gap of the type shown in FIG. 1.

Figure 4:
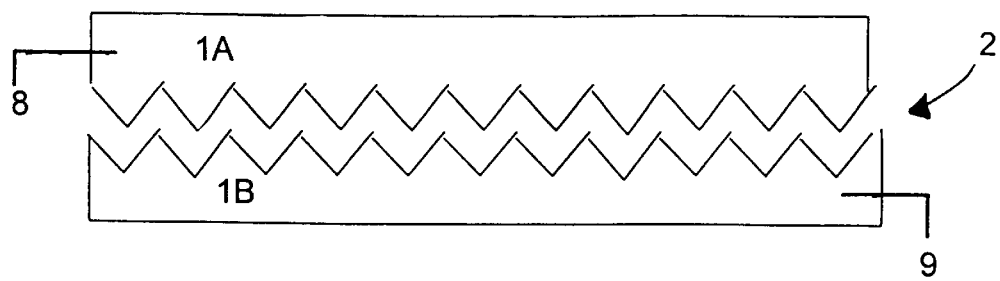
FIGS. 4–7 are schematic drawings of various constructions for the beam positioning means of the invention.

FIGS. 4–7 illustrate more complex forms for gap 2 which can be used in the practice of the invention. In particular, FIG. 4 illustrates a gap having a sawtooth pattern for which a high beam will produce pulses of a longer duration on bus 8 and a low beam will produce longer pulses on bus 9.

Figure 5:
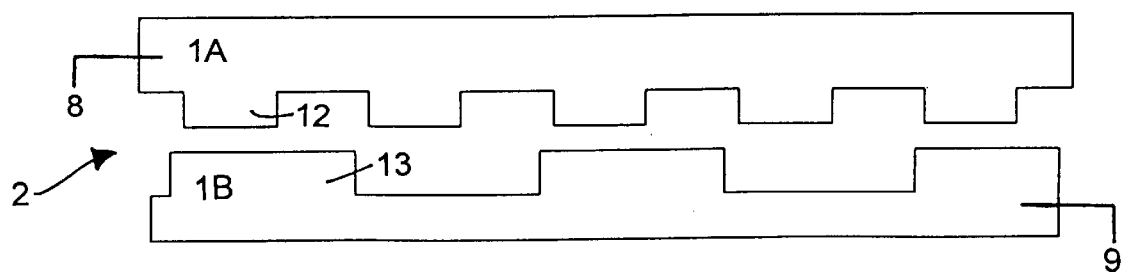

FIG. 5 illustrates the use of a gap composed of vertical fingers. For a high beam, the amplitude of the higher frequency signal produced by fingers 12 will increase while that of the lower frequency signal produced by fingers 13 will decrease. A low beam will produce the opposite effects.

Figure 6:
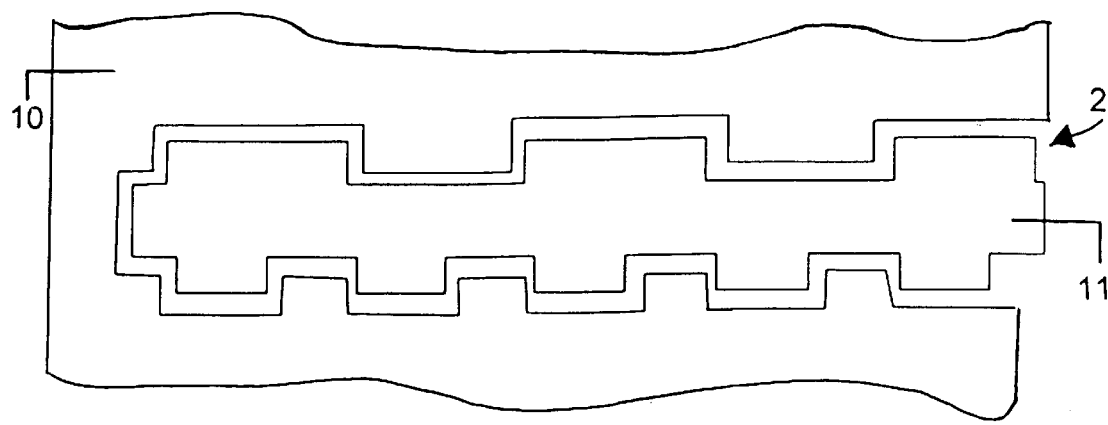
Figure 7:
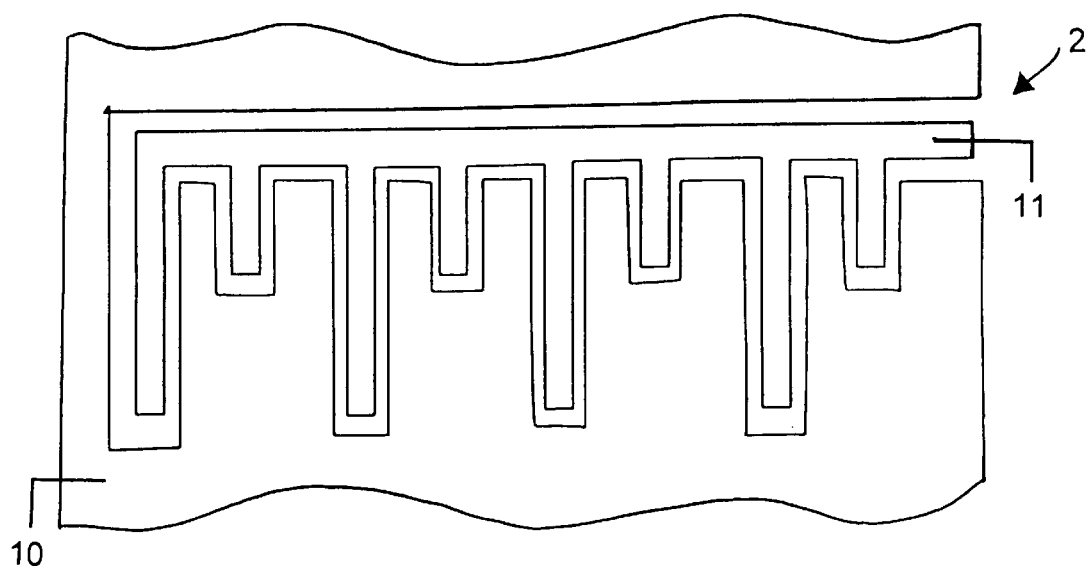
Figure 8:
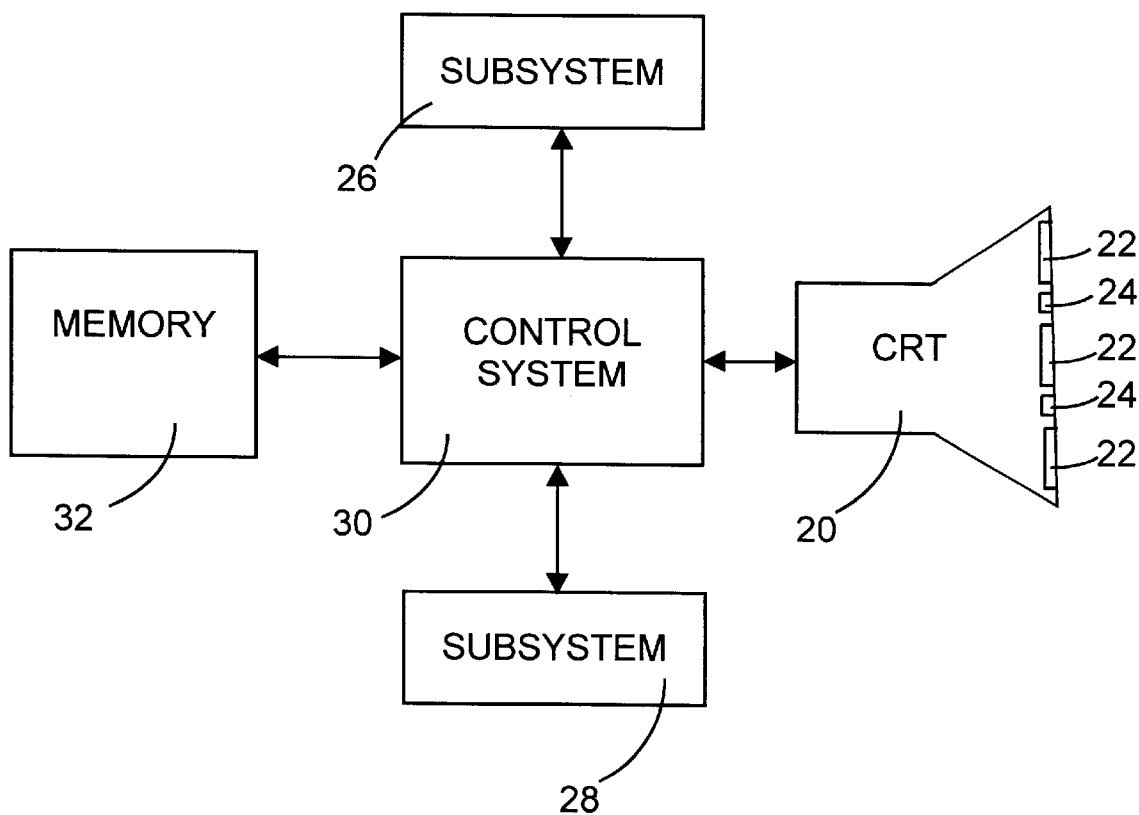
FIG. 8 is a schematic diagram of the system of the present invention. The reference numbers used in this diagram refer to the following elements of the invention discussed above and in further detail below:
20 cathode ray tube
22 triad
24 beam positioning means
26 subsystem for performing line buffering
28 subsystem for performing line buffering
30 control system
32 memory The foregoing drawings, which are incorporated in and constitute part of the specification, illustrate various embodiments of the invention, and together with the description, serve to explain the principles of the invention. It is to be understood, of course, that both the drawings and the description are explanatory only and are not restrictive of the invention. The drawings are not intended to indicate scale or relative proportions of the elements shown therein.

FIGS. 6 and 7 illustrate embodiments employing a single sensing bus 11 in combination with a high voltage return 10. Again for these embodiments, the amplitudes of the signals produced at the two frequencies will vary as the beam moves up and down relative to the midline of the gap region.

Instead of using conductive electrodes, the beam positioning means can employ two adjacent phosphor lines which emit light at different wavelengths. The vertical location of the beam can then be determined by detecting the intensity of each color as the beam is scanned along the interface between the two lines. A patterned interface can also be used with this embodiment of the positioning means, including a patterned interface employing only one phosphor, e.g., a patterned interface of the type shown in FIGS. 6 and 7.

In addition to the conductive electrode and phosphor line approaches, the areas between triads can be patterned with a metal with high secondary electron emission characteristics, with the beam position being determined by detecting the secondary electrons. Such an approach can be used with, for example, the patterned gaps of FIGS. 6 and 7.

Whatever form the beam positioning means takes, the data obtained from such means will be displaced in time (delayed in time) with respect to the beam's position because of the time required to electronically obtain and store the individual pieces of data generated as the electron beam is scanned along the length of the positioning means. Accordingly, the vertical correction used at any particular horizontal location when scanning the phosphor stripes of a triad will in general be the result of interpolating the data obtained when the beam positioning means was scanned. Linear or more complex interpolation techniques can be used for obtaining vertical correction values. To provide sufficient data for the beginning and/or end of a scan, the beam positioning means can have a longer horizontal length than the phosphor triads.

For both the line electrode and the secondary electron emission techniques, it is necessary to couple the detection currents from the inside of the tube to the outside of the tube. Although these currents are weak, they are at a potential of 10–30 kilovolts, and this makes their isolation important.

U.S. Pat. No. 4,635,107 to John Turner describes using instrumentation transformers to couple out the currents. Instrumentation transformers that are sensitive at the microamp level and which provide isolation for high voltage differences are very expensive. Also, the magnetic field used to scan the beam can induce currents in the instrumentation transformers which degrade the positioning signal.

In accordance with the invention, the detection signals are preferably capacitively coupled out of the tube using the tube's funnel wall as the capacitive dielectric. Such capacitive coupling can be done for a cost of only a few pennies to metallize several square inches of the inside and outside of the tube wall. The glass making up the tube wall has a dielectric constant in the range of 8–10 and has already been designed to withstand voltage differences in the 10–30 kilovolt range. Since the detection signal is modulated either as a result of modulating the electron beam or through the use of a patterned gap as described above, this signal can be readily separated from the high voltage DC by such a funnel wall capacitor.

The subsystems for line buffering the broadcast signal and the overall control system for toggling the line buffers and for scanning the electron beam are implemented using one or more programmed digital controllers, e.g., microprocessors, and one or more computer memories. When combined with the horizontally oriented beam positioning means and the horizontally oriented phosphor triads, these components allow practical mask-free, single gun color television systems to be produced economically.

What is claimed is:

1. A system for displaying a color broadcast television signal which comprises a series of frames, each frame being composed of a series of lines, said system comprising:

(A) a cathode ray tube which:
   (i) does not have a mask;
   (ii) has only one electron gun, the gun producing an electron beam;
   (iii) has a faceplate which defines an x-axis and a y-axis;
   (iv) has red phosphor stripes, green phosphor stripes, and blue phosphor stripes which are parallel to the x-axis and are organized into triads, the number of triads being at least equal to the number of broadcast lines in a frame;
   (v) has a plurality of beam positioning means which are parallel to the x-axis, one beam positioning means being associated with each triad;

(B) two subsystems for performing line buffering, wherein:
   (i) each subsystem is able to convert the red, green, and blue information of a line of the broadcast signal from a parallel form into a serial form so that the red, green, and blue phosphor stripes of a triad can be scanned serially, the two subsystems working alternately on the lines of the broadcast signal; and
   (ii) each subsystem has an input state during which it receives and processes a line of the broadcast signal and an output state during which it outputs serial information, one subsystem being in the input state while the other subsystem is in the output state; and (C) a control system which for each broadcast line:
   (i) toggles the subsystems between the input and output states;
   (ii) selects an appropriate beam positioning means for the particular broadcast line and then scans the electron beam along said selected beam positioning means to obtain information regarding the beam's position in the direction of the y-axis as a function of its scan position along said selected beam positioning means;

(iii) stores the information obtained in (C)(ii) in a memory; and (iv) serially scans the electron beam along the red, green, and blue phosphor stripes of the triad with which the selected beam positioning means is associated, using:

(a) the serial information of the subsystem which is in the output state to control the intensity of the beam as a function of its scan position along a phosphor stripe; and (b) the stored information of (C)(iii) to control the position of the beam in the direction of the y-axis as the beam is scanned along each phosphor stripe so as to align the beam with the phosphor stripe in the direction of the y-axis throughout the scan of the phosphor stripe.

2. The system of claim 1 wherein the control system serially scans the electron beam along the red, green, and blue phosphor stripes in a serpentine pattern.

3. The system of claim 1 wherein the beam positioning means comprises conducting means which defines a non-conducting gap.

4. The system of claim 3 wherein the electron beam is modulated in intensity as it is scanned along the beam positioning means.

5. The system of claim 3 wherein the non-conducting gap has a pattern.

6. The system of claim 5 wherein the pattern is a sawtooth pattern.

7. The system of claim 5 wherein the pattern comprises a plurality of fingers which extend in the direction of the y-axis.

8. The system of claim 7 wherein said fingers have at least two lengths in the direction of the y-axis.

9. The system of claim 1 wherein the beam positioning means comprises two phosphors which emit light at different wavelengths and which define a gap.

10. The system of claim 1 wherein the beam positioning means comprises a patterned, light-emitting phosphor.

11. The system of claim 1 wherein the beam positioning means comprises a patterned, secondary electron emitting metal.

12. The system of claim 1 wherein the cathode ray tube comprises a funnel wall and the beam positioning means comprises a capacitive coupling across said funnel wall.

13. A system for displaying a color broadcast television signal which comprises a series of frames, each frame being composed of a series of lines, said system comprising:

(A) a cathode ray tube which:
(i) does not have a mask;
(ii) has only one electron gun, the gun producing an electron beam;
(iii) has a faceplate which defines an x-axis and a y-axis;
(iv) has red phosphor stripes, green phosphor stripes, and blue phosphor stripes which are parallel to the x-axis and are organized into triads, the number of triads being at least equal to the number of broadcast lines in a frame;
(v) has a plurality of beam positioning means which are parallel to the x-axis, one beam positioning means being associated with each triad;

(B) two subsystems for performing line buffering, wherein:
(i) each subsystem is able to convert the red, green, and blue information of a line of the broadcast signal from a parallel form into a serial form so that the red, green, and blue phosphor stripes of a triad can be scanned serially, the two subsystems working alternately on the lines of the broadcast signal; and
(ii) each subsystem has an input state during which it receives and processes a line of the broadcast signal and an output state during which it outputs serial information, one subsystem being in the input state while the other subsystem is in the output state; and (C) a control system which:
(i) scans the electron beam along a selected beam positioning means to obtain information regarding the beam's position in the direction of the y-axis as a function of its scan position along said selected beam positioning means;
(ii) stores the information obtained in (C)(i) in a memory;
(iii) for each triad associated with the selected beam positioning means:
(a) toggles the subsystems between the input and output states; and
(b) serially scans the electron beam along the red, green, and blue phosphor stripes of the triad using:
(1) the serial information of the subsystem which is in the output state to control the intensity of the beam as a function of its scan position along a phosphor stripe; and
(2) the stored information of (C)(ii) to control the position of the beam in the direction of the y-axis as the beam is scanned along each phosphor stripe so as to align the beam with the phosphor stripe in the direction of the y-axis throughout the scan of the phosphor stripe.

14. The system of claim 13 wherein the control system serially scans the electron beam along the red, green, and blue phosphor stripes in a serpentine pattern.

15. The system of claim 13 wherein the beam positioning means comprises conducting means which defines a non-conducting gap.

16. The system of claim 15 wherein the electron beam is modulated in intensity as it is scanned along the beam positioning means.

17. The system of claim 15 wherein the non-conducting gap has a pattern.

18. The system of claim 17 wherein the pattern is a sawtooth pattern.

19. The system of claim 17 wherein the pattern comprises a plurality of fingers which extend in the direction of the y-axis.

20. The system of claim 19 wherein said fingers have at least two lengths in the direction of the y-axis.

21. The system of claim 13 wherein the beam positioning means comprises two phosphors which emit light at different wavelengths and which define a gap.

22. The system of claim 13 wherein the beam positioning means comprises a patterned, light-emitting phosphor.

23. The system of claim 13 wherein the beam positioning means comprises a patterned, secondary electron emitting metal.

24. The system of claim 13 wherein the cathode ray tube comprises a funnel wall and the beam positioning means comprises a capacitive coupling across said funnel wall.

* * * * *